United States Patent [19]

Tressler, III

[11] Patent Number: 4,719,343
[45] Date of Patent: Jan. 12, 1988

[54] PHASE RETARDING LASER RADIATION DETECTION SYSTEM

[75] Inventor: John H. Tressler, III, Chagrin Falls, Ohio

[73] Assignee: Honeywell Inc., Minneapolis, Minn.

[21] Appl. No.: 835,819

[22] Filed: Mar. 3, 1986

[51] Int. Cl.$^4$ ............................................. G02B 27/42
[52] U.S. Cl. ............................... 250/203 R; 250/550; 356/152
[58] Field of Search ................... 250/550, 203 R, 216; 356/141, 152

[56] References Cited

U.S. PATENT DOCUMENTS

| | | |
|---|---|---|
| 3,137,794 | 6/1964 | Seward . |
| 3,602,718 | 8/1968 | Michon et al. . |
| 3,797,940 | 3/1974 | King . |
| 3,801,825 | 4/1974 | Schwartz et al. . |
| 4,006,356 | 2/1977 | Johnson et al. ............... 250/203 R |
| 4,016,416 | 4/1977 | Shepherd, Jr. et al. . |
| 4,158,506 | 6/1979 | Collett . |
| 4,234,145 | 11/1980 | Leiboff ........................ 250/203 R |
| 4,259,009 | 3/1981 | Jernigan . |
| 4,624,563 | 11/1986 | Johnson ........................... 356/141 |

Primary Examiner—Edward P. Westin
Assistant Examiner—Jessica L. Ruoff
Attorney, Agent, or Firm—George A. Leone, Sr.

[57] ABSTRACT

A laser radiation detection system is disclosed comprising phase retarding apparatus for retarding a portion of the laser radiation incident on the system, optical focusing apparatus, detector apparatus and an electrical circuit. The optical focusing apparatus focuses the incident radiation on the detector apparatus. The detector apparatus is located in the focal plane and detects the presence of laser radiation due to the uneven distribution of light caused by the interference of the retarded portion of the incident radiation with the portion that remains in phase. The detector apparatus supplies output signals in response to the incident radiation received by each detector to the electrical circuit which then compares the various outputs from the detector apparatus in pairs and outputs a signal indicating the presence of laser radiation when the sum of the differences of the detector outputs is greater than a predetermined threshold value.

16 Claims, 11 Drawing Figures

PHASE RETARDING LASER RADIATION DETECTION SYSTEM

BACKGROUND OF THE INVENTION

I. Field of the Invention

This invention relates generally to optical detection systems, and more particularly to optical detection systems capable of detecting laser radiation.

II. Discussion of the Prior Art

The laser is finding its way into the modern world in applications ranging from military applications to surveyor's transits at construction sites. Accompanying the proliferation of lasers is an awareness that lasers can be dangerous, unseen threats to people and things. Many common lasers emit their radiation at wavelengths outside of the range of human sight, and are, therefore, invisible. They are no less dangerous for all their invisibility, however, and some method of knowing whether or not persons or objects are being exposed to laser radiation could be effective in preventing damage caused by laser radiation.

Prior art devices such as those disclosed in U.S. Pat. No. 3,801,825 to Schwartz, et al. use a plurality of at least two nonlinear limiting detectors to detect coherent radiation produced by a device such as a laser. The nonlinear limiting detectors must be selected from a group of materials having the property of absorbing input energy at a fundamental frequency into energy states other than at the fundamental. The energy at the fundamental is limited through a nonlinear process of harmonic generation and absorption and multiple photon absorption to an absolute limiting value. A lens focuses high intensity radiation on a first limiter. The outputs of the first limiter and a second limiter are processed by differencing with the effect that incoherent radiation is cancelled out in the output of a signal processor. Any difference beyond a preselected threshold value is indicative of coherent radiation. The system does not use interference fringes as part of its detection mechanism.

U.S. Pat. No. 4,158,506 to Collett teaches an electro-optical system for determining the polarization of optical pulses. The system comprises a six element optical polarizer and detector assembly with a one-quarter wavelength optical plate positioned over two of the polarizers. The outputs of the detectors are supplied to sum and difference amplifiers to determine the stokes parameters of an optical pulse incident to the system. No method of differentiating coherent radiation from incoherent radiation is disclosed.

This disclosure describes an optical technique for establishing when a person or object is under laser illumination. The sensor described herein could be employed to automatically shut-down the laser, alert a person to danger or initiate a battlefield countermeasure.

Laser light possesses a number of unique characteristics which not only make it useful, but also provide characteristics by which it may be easily identified. Laser illumination is monochromatic, or of a single wavelength. By knowing the wavelength, a filtered detector receiving a large stimulus will signal the probable presence of laser illumination. There are, however, non-laser sources which emit heavily in the same wavelengths as most lasers, so the "color" discrimination of laser light is unreliable.

Laser light is able to travel great distances in an intense, collimated beam. Collimation is the condition which exists when all the "rays" of light projected by a source travel in a parallel bundle. Incoherent light may be collimated, as in the case of a movie projector, but not to the extent that a laser's radiation is collimated. Laser light is collimated because it is coherent, and it is this coherence that above all else distinguishes the laser from other light sources.

A light source is said to be coherent when all points lying on an optical wavefront propagating forth from the source are in phase with one another. A point source emits coherent light, for each point on the expanding spherical wavefront is fully in phase with each other point, and the wavefront will reach some distance from the source simultaneously at all places. Most light sources are not coherent, or are "incoherent", because many point sources, each emitting light at its own random time, produce the net illumination. The wavefronts emitted from such a source have no constant phase relationships. When a thermal light source (incoherent) is collimated by a projection lens, the light leaving the lens is said to be "partially coherent", for some order has been introduced into the previously random propagation. Because no laser is ideal, all lasers are in fact emitting only partially coherent light, the coherence determined by the distance one may travel along the wavefront before one point bears no constant phase relationship to the point at the other end of the trip. FIG. 1 demonstrates this relationship. Points P1 and P2 are located on a coherent wavefront. Regardless of the distance from the emitting source, E, the points have a constant phase relationship.

Optical interference is the term applied to the phenomena whereby one optical wavefront disturbs the passage of another. When the two wavefronts possess some fixed phase relationship over the entire region of interaction, the disturbance is uniform over the entire region, and what is essentially a microscopic phenomena takes on macroscopic (visible) effects. The illumination of a surface with two interfering wavefronts results not in a uniform illumination, but instead in a periodic pattern of bright and dark regions, called "fringes". FIG. 2 shows a plot, S, of light intensity within a fringe pattern. It represents a cyclic pattern of bright and dark regions. Because a laser's radiation is coherent, it can be made to interfere with itself. Incoherent light will not (at least on a macroscopic level). The present invention described takes advantage of this interference phenomena to identify the presence of laser illumination.

SUMMARY OF THE INVENTION

A new and useful laser radiation detection system employing the principles of the present invention has now been discovered. The system comprises phase retarder means for retarding a portion of the radiation incident on the system. The system further comprises optical focusing means for focusing the incident radiation and a plurality of detector means for detecting the presence of incident radiant energy. The detector means produces electrical output signals in response to the incident radiant energy. The electrical output signals are fed into an electrical circuit means which provides differencing of the output signals. The electrical circuit means further provides an output signal indicating the presence of laser radiation when the difference in detector outputs exceeds a selected threshold.

DESCRIPTION OF THE PREFERRED EMBODIMENT

Figure 1:
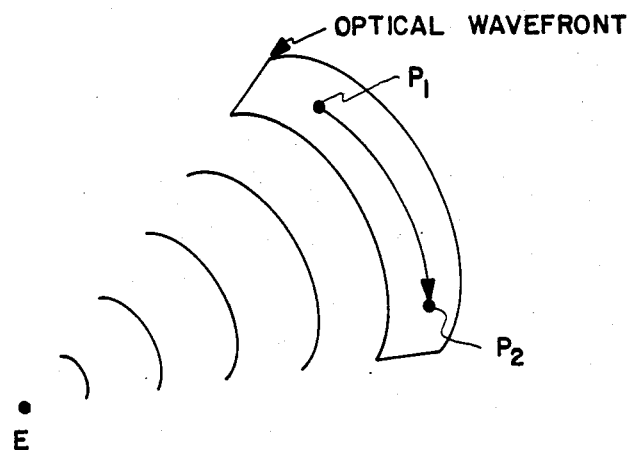
FIG. 1 shows the phase relationship between two sample points propagating on a coherent optical wavefront.
Figure 2:
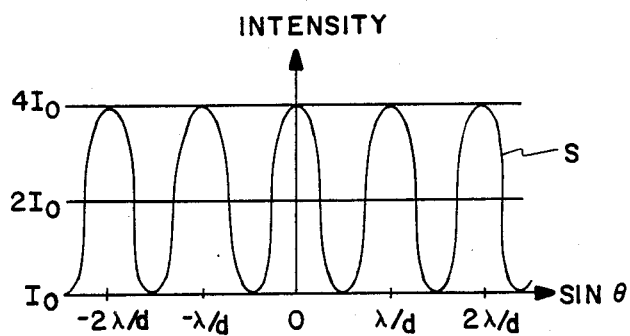
FIG. 2 graphically shows Young's fringes in intensity.
Figure 3:
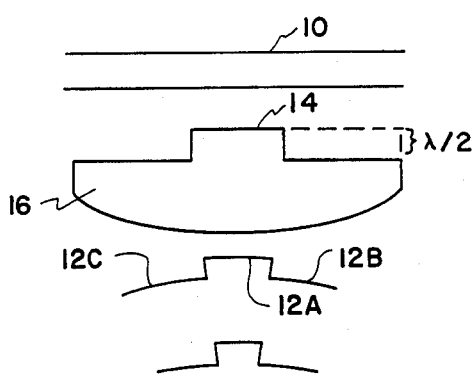
FIG. 3 illustrates the propagation of an incoming coherent wavefront through a laser radiation detection system as provided by the present invention.

Referring now to FIG. 3, a laser radiation detection system is shown. An incident laser wavefront 10 propagates through phase retarder means 14 for retarding a portion of the incident coherent wavefront 10. The phase retarder means may advantageously be a one-half wavelength phase retarder, such as a half wave optical plate. In this embodiment, the phase retarder means 14 is placed forwardly of the focusing means 16 which may advantageously be a plano-convex lens for focusing the incident coherent wavefront. Upon passing through the phase retarder means 14, a portion 12A of the incident coherent wavefront is retarded in phase relative to the rest of the wave, designated as portions 12B and 12C. Detector means 20, comprising a plurality of optical detectors 20A, 20B, 20C and 20D, receives the incident coherent wavefront now consisting of portions 12A, 12B and 12C and outputs a plurality of electrical signals corresponding to the intensity of the light received by each individual detector. The output signals of the detector group 20 are received by electrical circuit means 22. Electrical circuit means 22 represents a circuit for providing differencing of the electrical output signals of the detector group 20. Electrical circuit means 22 may advantageously supply an output signal to an external device, such as an alarm, indicating the presence of laser radiation when the difference in the outputs of the detector group is greater than a predetermined threshold value. Fringe pattern 24 shows the fringe pattern within the focal region of the detector group. Due to the phase retardation of the incident light, a fringe pattern will unequally illuminate detector pairs within the focal region. This unequal distribution of light among the detectors will result in output signals from the detectors 20A, 20B, 20C and 20D that vary in magnitude. It is the difference in magnitude which indicates the presence of coherent light.

Figure 4:
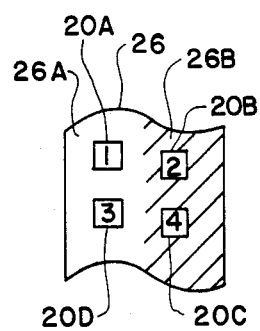
FIG. 4 symbolically shows the effects of interference fringes overlaying a group of symmetrically arrayed detectors.

FIG. 4 further illustrates the effects of a fringe pattern, denoted generally as 26, comprising portions 26A and 26B overlaying a group of detector pairs 20A, 20B, 20C and 20D. The unshaded portions of fringe pattern 26A represents a bright fringe area or maxima. The shaded portion 26B represents a dark fringe area, or minima. Therefore, in FIG. 4, detectors 20A and 20D are receiving high intensity incident laser light, while detectors 20B and 20C are receiving little or no light. As a result, detectors 20A and 20D will output a corresponding electrical signal to electrical circuit means 22 which is greater in magnitude than the output signals of detectors 20B and 20C where detectors 20B and 20C are located in the dark fringe area. The electrical circuit means 22 would then compare in pairs signals 20A against 20C and 20B, and 20D against 20B and 20C. If the sum of all of the differences of the compared signals of the detector pairs is greater than a predetermined threshold value, the electrical circuit means outputs a signal indicating that laser radiation has been detected.

Figure 5:
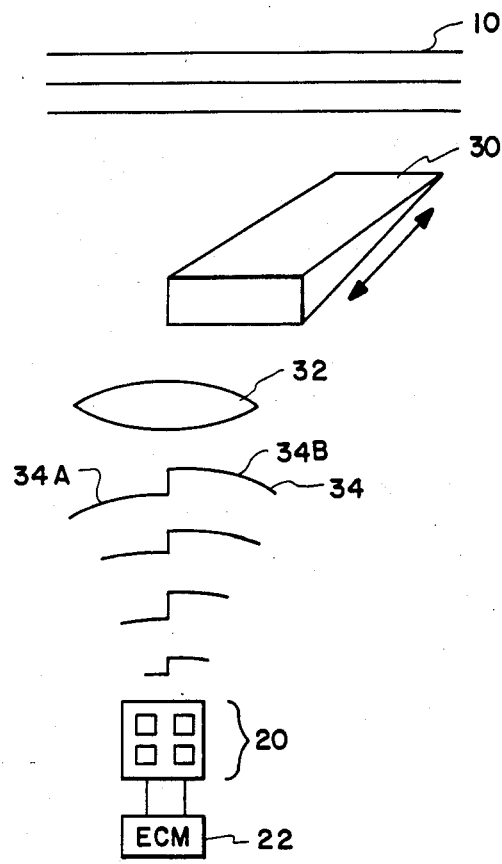
FIG. 5 shows an embodiment of the invention wherein the phase retarder means comprises an oscillating wedge retarder.

FIG. 5 shows another embodiment of the present invention wherein the phase retarder means is an oscillating wedge retarder 30 covering a portion of the aperture of the laser detection system. Incident laser light passes through the oscillating wedge retarder 30 and subsequently through focusing means 32. Here the focusing means 32 can advantageously be a convex lens. The oscillating wedge retarder 30 introduces a phase shift into the incident laser light resulting in a portion of the light being out of phase with the original wavefront. After the incident wavefront is focused by the focusing means 32, it will consist of a wavefront 34 which has divided into two portions 34A and 34B, wherein 34B lags 34A by the amount of phase retardation introduced by the oscillating wedge retarder. Detector group 20 receives the wavefront 34 and outputs electrical signals corresponding to the fringe patterns received by the detector group to the electrical circuit means 22. These signals are processed by the electrical circuit means as described hereinabove with reference to FIG. 4.

Still referring to FIG. 5, it can be seen that the geometry of the detector means, the number of detectors, and the geometry of the phase retarding mask at the sensor optical aperture are all variables to be used in the design of a specific device application. The phase retarder might advantageously be a wedge where many laser wavelengths are to be detected with the same device. Mechanical oscillation of the wedge puts an oscillation into the contrast of the fringe pattern as well as a lateral shift in the direction orthogonal to the wedge motion into the fringe pattern, and also modulates the output. Through heterodyne or other suitable demodulation techniques, the signal can be extracted from the carrier induced by the oscillation, and information regarding the wavelength can be extracted. It is believed that the direction of the laser illumination may also be extracted from such a signal.

Figure 6:
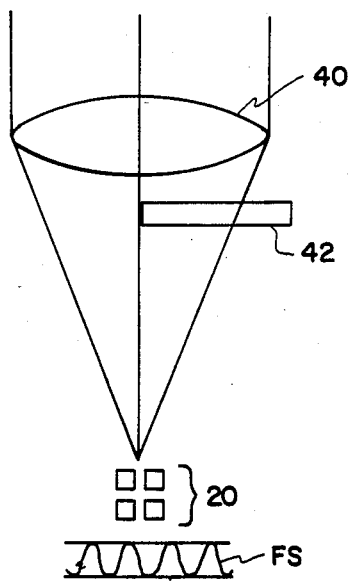
FIG. 6 shows yet another embodiment of the invention incorporating a one-half wavelength retarder plate.
Figure 7A:
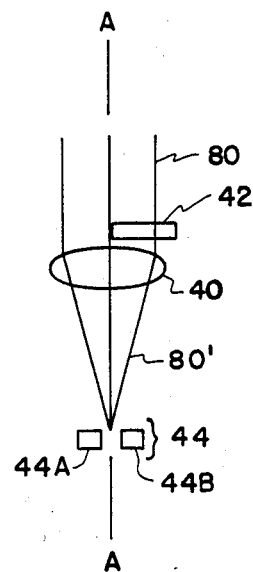
FIGS. 7A-7C symbolically and graphically shows focus effects under coherent and incoherent radiation.
Figure 7B:
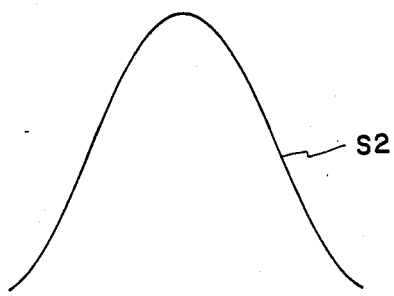
Figure 7C:
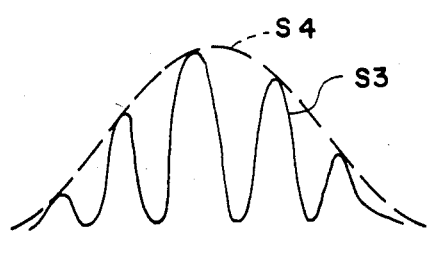
Figure 7C:
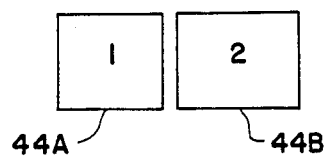

FIG. 6 shows yet another embodiment of the invention. In FIG. 6A, a laser detection system is shown comprising a focusing means, 40, retarder plate 42, and a detector group 20 as in the previously discussed embodiments. The fringe structure impinging upon the detector group 20 is shown graphically by plot FS. In this embodiment of the invention, the focusing means is advantageously a convex lens and the phase retarder means is advantageously a one-half wavelength phase retarder plate.

Referring now to FIG. 7, focus effects under two types of illumination, incoherent and coherent, are shown. FIG. 7A shows incident light 80 entering a laser radiation detection system wherein phase retarder plate 42 is placed over a portion of the aperture of the detection system thereby retarding a portion of the incident light. Optical focusing means 40 then focuses the partially retarded incident light 80' onto a detector group 44 comprised of a pair of detectors 44A and 44B. Because the detectors 44A and 44B share a lens 40 and are colocated on either side of its axis of symmetry, denoted by line AA, they receive radiation from approximately the same portion of the field of view. FIG. 7B shows the intensity profile S2 at the focus for incoherent illumination. FIG. 7C shows the intensity profile S3 with an envelope S4 at the focus for coherent illumination. It can be seen that the two detectors 44A and 44B would have equal ouputs under an incoherent focus, but not under the structured focus of coherent light.

Figure 8:
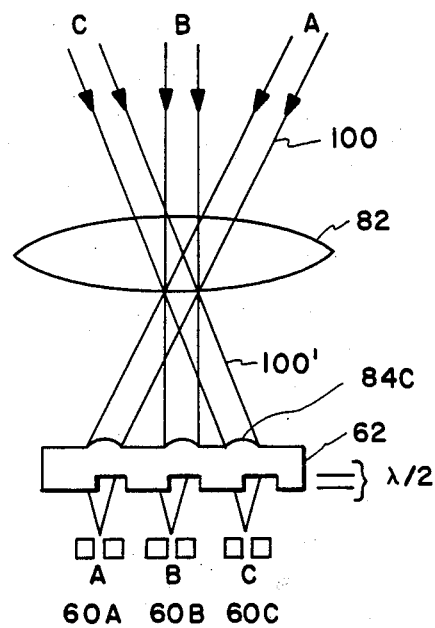
FIG. 8 shows an array of detector/lens pairs in one embodiment of a laser detection system as provided by the present invention.

FIG. 8 shows an array of detector pairs placed at the focus of a single large lens 82. The array comprises detector pairs 60A, 60B and 60C. Incident radiation from laser sources enters the detection system through lens 82. Phase retarding means 62 introduces a face shift into a portion of the focused incident light 100'. A plurality of focusing means 84A, 84B and 84C focus the incoming light 100' onto detector pairs 60A, 60B and 60C. Through selectively arranging the detector array an off-axis laser source will excite a particular detector pair into alarm, signaling not only that there is a laser detected but also indicating where the laser is located in the field of view of the large focusing means 82.

Figure 9:
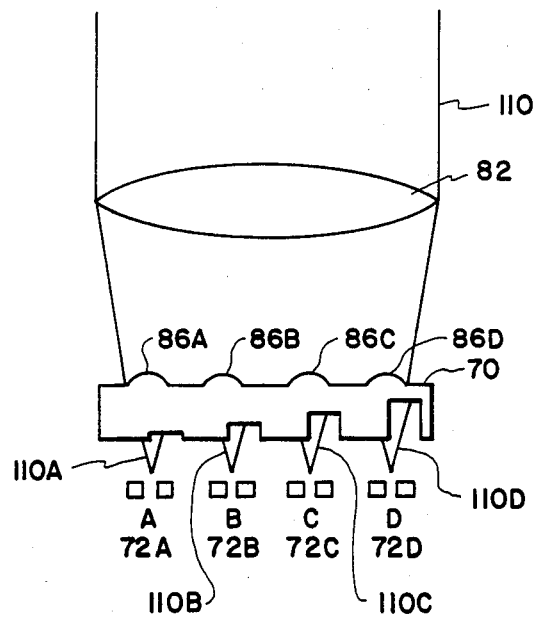
FIG. 9 shows an array of detector/lens pairs placed selectively to optically couple with phase retarding masks optimized for a plurality of different wavelengths.

Referring now to FIG. 9, alternatively to the system in FIG. 8, each detector pair can be located under an individual phase retarding mask optimized for a particular wavelength to aid in the identification of the laser waveband. FIG. 8 shows an array of phase retarder/lens pairs wherein the lenses 86A, 86B, 86C and 86D are grouped with the phase retarder array 70 wherein 70A, 70B, 70C and 70D are selectively designed to provide a one-half wavelength retardation for different specific wavelengths. In one example, the phase retarder 70A may be optimized at point 5 micrometers, 70B optimized at 1 micrometer, 70C optimized at 5 micrometers and 70D optimized at 10 micrometers.

While there has been shown and described a preferred embodiment of the invention, those skilled in the art will appreciate that various changes and modifications may be made to the illustrated embodiment without departing from the true spirit and scope of the invention which is to be determined from the appended claims.

The embodiments of the invention in which an exclusive property or right is claimed are defined as follows:

1. A laser radiation detection system comprising:
   phase retarder means for retarding less than all of the radiation incident on the system;
   optical focusing means for focusing the radiation incident on the system;
   detector means for detecting the presence of incident radiant energy and producing a plurality of electrical output signals in response to the incident radiant energy and in proportion to the intensity of the incident radiant energy the detector means being located in the focal plane of the optical focusing means;
   electrical circuit means for providing differencing of the plurality of electrical output signals of the detector means in pairs, and for outputting a signal indicating the presence of laser radiation when the sum of the differences of the electrical output signals of the detector means is greater than a preselected threshold, the electrical circuit means being selectively coupled to the detector means.

2. The system of claim 1 wherein:
the phase retarder means comprises a one-half wavelength optical plate.

3. The system of claim 2 wherein:
the optical focusing means is a convex lens.

4. The system of claim 3 wherein:
the detector means comprises at least two detectors arrayed symmetrically around the focal axis of the optical focusing means.

5. The system of claim 2 wherein:
the optical focusing means is a plano-convex lens.

6. The system of claim 5 wherein:
the detector means comprises at least two detectors arrayed symmetrically around the focal point of the optical focusing means.

7. The system of claim 1 wherein:
the optical focusing means is a convex lens.

8. The system of claim 7 wherein:
the detector means comprises at least two detectors arrayed symmetrically around the focal point of the optical focusing means.

9. The system of claim 1 wherein:
the optical focusing means is a plano-convex lens.

10. The system of claim 9 wherein:
the detector means comprises at least two detectors arrayed symmetrically around the focal point of the optical focusing means.

11. The system of claim 1 wherein:
the detector means comprises at least two detectors arrayed symmetrically around the focal point of the optical focusing means.

12. The system of claim 1 wherein:
the phase retarder means comprises an oscillating wedge retarder.

13. The system of claim 12 wherein:
the optical focusing means comprises a convex lens.

14. The system of claim 13 wherein:
the detector means comprises at least two detectors arrayed symmetrically around the focal axis of the optical focusing means.

15. The system of claim 12 wherein:
the optical focusing means comprises a plano-convex lens.

16. The system of claim 15 wherein:
the detector means comprises at least two detectors arrayed symmetrically around the focal axis of the optical focusing means.

* * * * *